(12) United States Patent
Pezeshki et al.

(10) Patent No.: US 12,299,381 B1
(45) Date of Patent: May 13, 2025

(54) ACTIVE AGREEMENT COMPONENTS

(71) Applicant: DocuSign, Inc., San Francisco, CA (US)

(72) Inventors: Parsa Pezeshki, Brooklyn, NY (US); Peter Geoffrey Lerato Hunn, Dallas, TX (US); David Gonzalez, Seattle, WA (US); Michael Grover, Hoboken, NJ (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 18/362,785

(22) Filed: Jul. 31, 2023

(51) Int. Cl.
*G06F 40/166* (2020.01)
*G06F 40/151* (2020.01)
*G06F 40/174* (2020.01)

(52) U.S. Cl.
CPC .......... *G06F 40/166* (2020.01); *G06F 40/151* (2020.01); *G06F 40/174* (2020.01)

(58) Field of Classification Search
CPC ..... G06F 40/166; G06F 40/151; G06F 40/174
See application file for complete search history.

(56) References Cited

U.S. PATENT DOCUMENTS

| | | | |
|---|---|---|---|
| 2002/0083099 A1* | 6/2002 | Knauss | G06Q 30/0601 715/236 |
| 2013/0019156 A1* | 1/2013 | Gonser | G06F 40/174 715/221 |
| 2013/0254111 A1* | 9/2013 | Gonser | G06F 40/174 705/44 |
| 2021/0027015 A1* | 1/2021 | Roberts | G06F 9/547 |

* cited by examiner

*Primary Examiner* — Andrey Belousov
(74) *Attorney, Agent, or Firm* — Shumaker & Sieffert, P.A.

(57) ABSTRACT

Techniques are described for a system document management comprising one or more processors having access to a memory. The system is configured to open an electronic document that is to be electronically signed, the electronic document having an active component connected to an external data source. The system is further configured to, while the electronic document is open, execute the active component to retrieve data from the external data source. The system is further configured to insert the data retrieved from the external data source into a field of the electronic document. The system is further configured to output, for display, a graphical user interface that presents the content of the electronic document to a user device.

18 Claims, 10 Drawing Sheets

ACME COMMUNICATIONS

ORDER FORM
Cloud Services

Contact Information

Prepared For:

332A — [Customer Name]
[Contact Name]
[Customer Addre
[Phone #]
[Email]

354

OBJECTS

Account

Account Name — 356
   Account Number
   Account Source
   Annual Revenue
   Billing Address
   Billing City
   Billing Country red By:
ler Name]

[Month],[DD],[YYYY]

| Order Descrip | Total |
|---|---|
| Monthly Subscri Premium | $10000.00 |
| Monthly Subscri Basic | $1000.00 |
| Total Subscription Fees: | $11000.00 |

ACME COMMUNICATIONS

ORDER FORM
Cloud Services

Contact Information

Prepared For:                           Prepared By:

332A

John Smith
[Contact Name]
[Customer Address]
[Phone #]
[Email]

| Order Description | Unit Price | Quantity | Total |
|---|---|---|---|
| Monthly Subscription - Premium | $1000.00 | 10 | $10000.00 |
| Monthly Subscription - Basic | $100.00 | 10 | $1000.00 |
| Total Subscription Fees: | | | $11000.00 |

FIG. 3F

ACTIVE AGREEMENT COMPONENTS

TECHNICAL FIELD

This disclosure relates generally to electronic document management.

BACKGROUND

Document management systems manage electronic documents for various entities, such as people, companies, or organizations. Such electronic documents may include various types of agreements that can be executed (e.g., electronically signed) by entities, such as non-disclosure agreements, indemnity agreements, purchase orders, lease agreements, employment contracts, and the like.

SUMMARY

Aspects of the present disclosure describe techniques for using active components to enable an electronic document to act as a dynamic entity that is able to perform actions and to communicate with external data sources. An electronic document may include active components that connect to external data sources, such as external systems and platforms, to interact with such external data sources and to pass data between the electronic document and the external data sources. An electronic document may also include active components that can perform in-document functions within the electronic document. In this way, active components may transform an electronic document from being a stand-alone static document into a dynamic document that serves as a persistent source of information and actions.

An agreement document may be an electronic document that sets out terms and conditions of an agreement between two or more parties, and the parties to the agreement may sign the agreement document to signify acceptance of the agreement. An agreement document may be in the form of an electronic document that may be electronically signed by the parties to the agreement.

An author may create, at a document management platform, an agreement document that includes the terms and conditions of an agreement. For example, the author may edit such an agreement document to include details of the parties to the agreement, such as the names of the entities that are parties to the agreement, contact information (e.g., addresses, phone numbers, email addresses, etc.) of the parties to the agreement, and the like. The author may also edit an agreement document to include terms of the agreement, such as the products or services being purchased by a buying party of the agreement, the quantity of the products or services being purchased, the unit prices of the products or services, the period of time in which the agreement is valid, and the like.

For example, the author may look up the names and contact information of parties to the agreement stored in a customer relationship management system and may manually insert the names and contact information of parties to the agreement into the agreement document, such as by typing such information in the agreement document or by copying and pasting such information from the customer relationship management system. Similarly, the author may look up the prices of products or services that a buying party of the agreement has agreed to purchase that are stored in a payment processing system and may manually insert the prices of the products and services into the agreement document, such as by typing such information in the agreement document or by copying and pasting such information from the payment processing system.

However, manually inserting such information into an agreement document may be slow and mistake prone, and any incorrect information mistakenly inputted into the agreement may have financial and/or legal consequences. Further, if the information inputted by the author into the agreement document changes after the author has inputted the information into the agreement document, the agreement document may therefore include incorrect information. For example, if the prices of the products and services have changed after the author has inputted the prices into the agreement document, the agreement document may list incorrect prices for the products and services.

Once the author has finished drafting the agreement document, the author may send the agreement document to a signing party to review, revise, and/or sign the agreement document. If the agreement document refers to sections of a related document (e.g., a master services agreement that governs the agreement document), the signing party may open the related document to view the sections to which the agreement document refers. If the agreement document refers to multiple different sections of multiple different related documents, it may be tedious for the signing party to view those multiple different sections of multiple different related documents.

In accordance with aspects of this disclosure, an electronic document such as an agreement document may include active components that may perform functions such as connecting to data sources external to the electronic document. An active component that connects to an external data source may be able to retrieve information, such as data values of fields in the external data source, that can be included in the electronic document. For example, one or more active components may automatically connect to a customer relationship management system to retrieve names and contact information for dynamic insertion into the electronic document. In another example, one or more active components may connect to a payment processing system to retrieve dynamic prices of products or services for insertion into the electronic document. If the payment processing system changes the prices of the products and services, the one or more active components may be able to automatically retrieve the latest, dynamic prices of the products or services from the payment processing system and to update the electronic document with the most up-to-date prices of the products or services. Unlike placeholder fields, where data can be merged based on the syntax of the document, which may limit users to sequential snapshots of data in electronic documents, active components may enable native connectivity to and information access from external data sources to dynamically retrieve and insert data from such external data sources.

In addition to inserting information retrieved from external data sources into an electronic document, one or more active components included in an electronic document may also present information retrieved from external data sources for viewing by a user of the electronic document. For example, an active component included in an electronic document may connect to other related electronic documents and may enable a user to interact with the electronic document to view sections of other related electronic documents referenced in the electronic document.

The techniques described herein may provide one or more technical advantages that realize one or more practical applications. For example, by connecting an electronic document to data sources that are external to the electronic document, active components included in the electronic document may improve the speed and accuracy with which an electronic document can be authored. Improving the speed and accuracy with which electronic documents can be authored may improve the user experience in creating and modifying electronic documents at a document management platform. Improving the speed and accuracy in which electronic documents can be authored may reduce the time that a user may spend to interact with a computing device that connects to the document management platform to create and/or modify the electronic document, which may reduce the processing load and power usage of such a computing device.

Furthermore, the techniques described herein may improve the technical field of electronic document management by document management platforms. By connecting an electronic document to data sources that are external to the electronic document, active components included in the electronic document may transform an electronic document from a standalone static document into a dynamic document that can connect to external data sources to access information stored in the external data sources and that can be dynamically updated in real-time based on changes to the information stored in the external data sources, thereby providing a technical improvement in the technical field of electronic document management.

In some aspects, the techniques described herein relate to a computing system including one or more processors having access to a memory, the one or more processors configured to: open an electronic document that is to be electronically signed, the electronic document having an active component connected to an external data source; while the electronic document is open, execute the active component to retrieve data from the external data source; insert the data retrieved from the external data source into a field of the electronic document; and output, for display at a user device, a graphical user interface that presents the content of the electronic document, the content of the electronic document including the data inserted into the field of the electronic document.

In some aspects, the techniques described herein relate to a method including: opening, by one or more processors, an electronic document that is to be electronically signed, the electronic document having an active component connected to an external data source; while the electronic document is open, executing, by the one or more processors, the active component to retrieve data from the external data source; inserting, by the one or more processors, the data retrieved from the external data source into a field of the electronic document; and outputting, by the one or more processors and for display at a user device, a graphical user interface that presents the content of the electronic document.

In some aspects, the techniques described herein relate to a computer-readable storage medium encoded with instructions that, when executed, cause at least one processor of a computing system to: open an electronic document that is to be electronically signed, the electronic document having an active component connected to an external data source; while the electronic document is open, execute the active component to retrieve data from the external data source; insert the data retrieved from the external data source into a field of the electronic document; and output, for display, a graphical user interface that presents content of the electronic document, the content of the electronic document including the data inserted into the field of the electronic document.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

FIGS. 3A-3G are conceptual diagrams illustrating example graphical user interfaces for embedding active components in an electronic document, in accordance with one or more techniques of this disclosure.

Like reference characters denote like elements throughout the text and figures.

DETAILED DESCRIPTION

Figure 1:
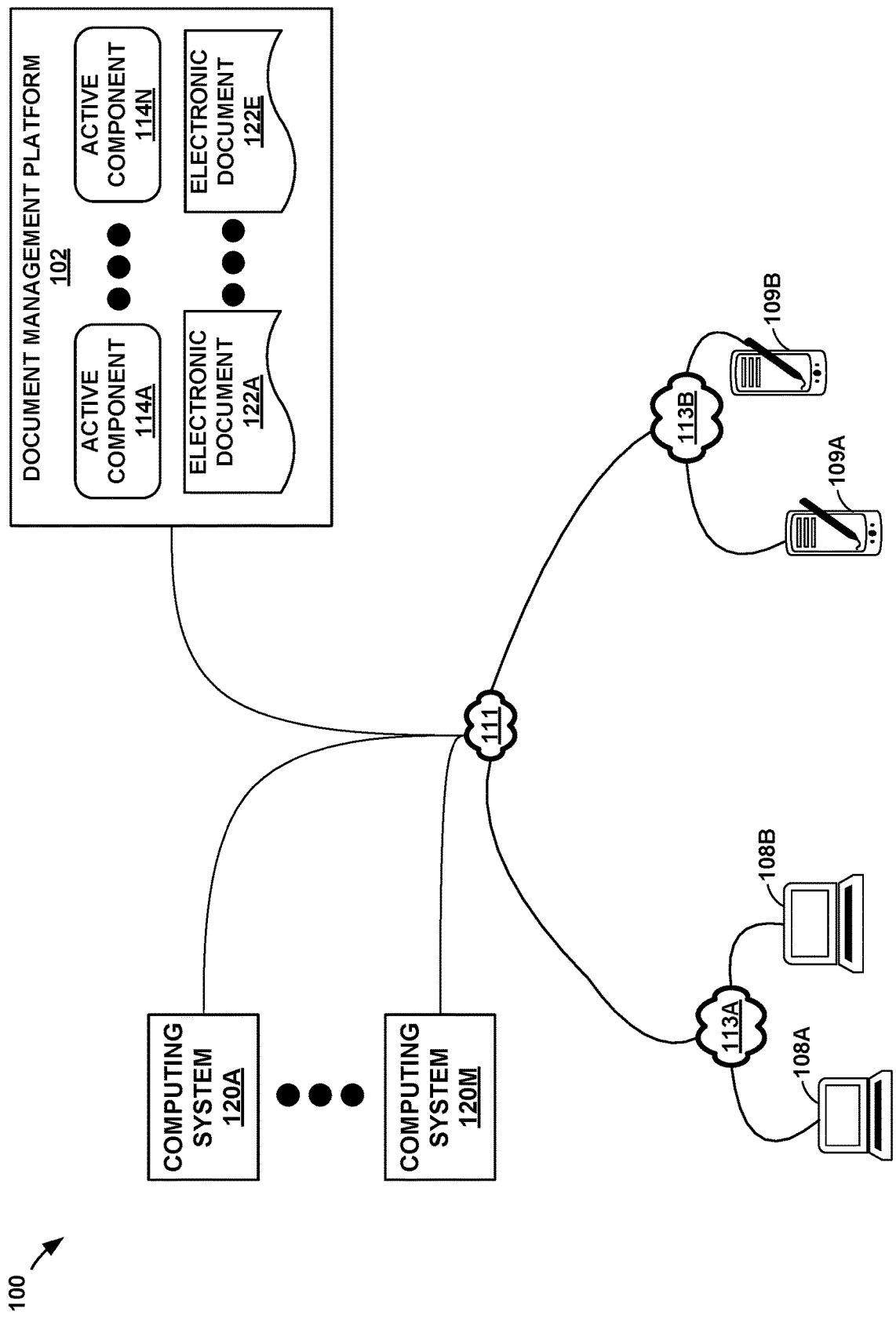
FIG. 1 is a block diagram illustrating an example system for managing electronic documents, in accordance with the techniques of this disclosure.

FIG. 1 is a block diagram illustrating an example system 100 for managing electronic documents, in accordance with the techniques of this disclosure. In the example of FIG. 1, system 100 includes a centralized document management platform 102 that provides storage and management of documents or document packages for various users. For example, document management platform 102 may provide storage and management of documents or document packages for users associated with sender device 108A and sender device 108B via network 111 and network 113A. In another example, document management platform 102 may provide storage and management of documents or document packages for users associated with signer device 109A and signer device 109B via network 111 and network 113B. Document management platform 102 may include a collection of hardware devices, software components, and/or data stores that can be used to implement one or more applications or services provided to one or more sender devices 108 and one or more signer devices 109 via network 113. Document management platform 102 may be configured to allow a sender to create and send documents to one or more recipients for negotiation, collaborative editing, electronic execution (e.g., electronic signature), automation of contract fulfillment, archival, and analysis, among other tasks. For example, a user of sender device 108A and/or sender device 108B (collectively referred to herein as sender device 108) may be a sender of a document package (e.g., envelope) and a user of signer device 109A and/or signer device 109B (collectively referred to herein as signer device 109) may be a recipient of the document package. Using signer device 108, the signer may review content or terms presented in an electronic document, and in response to agreeing to the content or terms, can electronically execute the document. In some aspects, in advance of the execution of the document, the sender may generate, using sender device 108, the document package to provide to the one or more signers. The document package may include at least one document to be signed and information for one or more signers (e.g., email information and a name for each signer). In some examples, the document package may also include one or more permissions defining actions the one or more recipients can perform in association with the document package. In some examples, the document package may also identify tasks the one or more signers are to perform in association with the document package.

Document management platform 102 may also connect to computing systems 120A-120M (collectively referred to herein as "computing systems 120") that may act as data sources for document management platform 102. Examples of computing systems 120 may include a customer relationship management system, a payment processing system, a payroll management system, an online mapping system, an online calendaring system, an online messaging system, a cloud service provider system, and/or any other computing system.

Document management platform 102 may be implemented within a centralized document system, an online document system, a document management system, or any type of digital management platform. Example environments for document management platform 102 may include, but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Document management platform 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, healthcare software, or other types of applications or services. The applications or services may be provided as a service (-aaS) for Software-aaS, Platform-aaS, Infrastructure-aaS, Data Storage-aas (dSaaS), or other type of service.

In some examples of FIG. 1, document management platform 102 may allow sender device 108 and signer device 109 to access, via network 111 using a communication protocol, electronic documents 122A-122E (collectively referred to herein as "electronic documents 122" or simply as "documents 122") stored in document management platform 102 as if such electronic documents 122 were stored locally (e.g., to a hard disk of a corresponding device 108, 109). Example communication protocols for accessing documents may include, but are not limited to, Server Message Block (SMB), Network File System (NFS), or AMAZON Simple Storage Service (S3). In some examples of FIG. 1, document management platform 102 may output, via network 111 using a communication protocol, electronic documents 122 for presentation via an application executing on corresponding devices 108, 109. Example applications may include a web browser, a client application for document management platform, or a document viewer. Document management platform 102 may output a graphical user interface for presenting electronic documents 122.

Document management platform 102 may communicate with user devices (e.g., sender device 108A, 108B or the signer device 109A, 109B) and computing systems 120 over network 111, network 113A, and/or network 113B to send and/or receive instructions, documents, and/or other information. Each of networks 113A and 113B and network 111 may include the Internet and/or may include or represent any public or private communications network or other network. For instance, each of networks 113 may be a cellular network, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIG. 1 may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIG. 1 or otherwise on network 113 and/or network 111 may be in a remote location relative to one or more other illustrated devices or systems.

Data exchanged over the network 113 and/or network 111 may be represented using any suitable format, such as hypertext markup language (HTML), extensible markup language (XML), or JavaScript Object Notation (JSON). In some aspects, the network 113 and/or network 111 may include encryption capabilities to ensure the security of documents. For example, encryption technologies may include secure sockets layers (SSL), transport layer security (TLS), virtual private networks (VPNs), and Internet Protocol security (IPsec), among others.

Examples of devices 108 and devices 109 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), etc. In some examples, devices 108 and devices 109 may represent a cloud computing system that provides one or more services via a network. That is, in some examples, devices 108 and devices 109 may be a distributed computing system.

In an example, a user of a computing device (e.g., the sender device 108A, 108B or the signer device 109A, 109B) may represent an individual user, group, organization, or company that is able to interact with document packages (or other content) generated on or managed by the document management platform 102. Each user may be associated with a username, email address, full or partial legal name, or other identifier that may be used by the document management platform 102 to identify the user and to control the ability of the user to view, modify, execute, or otherwise interact with document packages managed by the document management platform 102. In some aspects, users may interact with the document management platform 102 through a user account with the document management platform 102 and one or more user devices accessible to that user. In situations in which document management platform 102 stores and uses information of users operating devices 108 and devices 109, document management platform 102 may request explicit permission from the users prior to storing and using any personally identifiable information of the users.

A user may use sender devices 108 and signer devices 109 to open and view electronic document 122A. A user may use sender device 108A to communicate with document management platform 102 to open electronic document 122A for editing, and document management platform 102 may output a graphical user interface that presents the content of electronic document 122A for display at sender device 108A. For example, the user may use a web browser executing at sender device 108A to interact with document management platform 102 to open electronic document 122A, and document management platform 102 may output a graphical user interface that presents the content of electronic document 122A for viewing at sender device 108A using the web browser at sender device 108A.

A user may use sender device 108A to edit electronic document 122A and to send electronic document 122A to signer devices 109 for electronic signing. For example, electronic document 122A may be an agreement template, and the user may edit electronic document 122A in order to generate an agreement document that can be sent to a signer for electronic signing. When electronic document 122A is being edited prior to being sent to a signer for electronic signing, the electronic document 122A may be in an authoring state. The user may use sender device 108A to interact with document management platform 102 to send electronic document 122A for electronic signing. Once the electronic document 122A has been sent for electronic signing, electronic document 122A may transition from the authoring state to a sent state.

A user that is a signer may use one or more of signer devices 109 to receive, review, and electronically sign electronic document 122A. For example, when electronic document 122A is sent to the signer, document management platform 102 may send, to one or more of signer devices 109, an indication that electronic document 122A has been sent to the signer, and the signer may use one or more of signer devices 109 to open electronic document 122A. For example, the signer may use a web browser executing at signer device 109A to interact with document management platform 102 to open electronic document 122A, and document management platform 102 may output a graphical user interface that presents the content of electronic document 122A for viewing at signer device 109A using the web browser at signer device 109A.

The signer may therefore use signer device 109A to view and electronically sign electronic document 122A. For example, the signer may electronically sign electronic document 122A by inputting text at electronic document 122A to electronically sign electronic document 122A or by selecting an option in the graphical user interface outputted by document management platform 102 for display at signer device 109A to electronically sign electronic document 122A. Once the signer electronically signs electronic document 122A, electronic document 122A may transition from the sent state to a signed state.

In accordance with the techniques described herein, document management platform 102 may include store active components 114A-114N (collectively, "active components 114"), which may be software components that can be embedded in an electronic document, such as electronic document 122A, to add extensible functionality to the electronic document. Active components 114 may be embedded in electronic document 122A as fields, variables, data, text (e.g., words, sentences, and paragraphs), tables, objects, and the like in the content of the electronic document to connect actions to the contents of the electronic document 122A and to connect the electronic documents 122A to data sources external to the electronic document to pass data between the electronic document and the external data sources. Such data sources external to electronic document 122A may include any one or more of computing systems 120 that are external to document management platform 102. Such data sources external to electronic document 122A may alternatively, or additionally, include one or more other electronic documents 122 stored in document management platform 102, such as electronic document 122E. Active components 114 may be re-used by different electronic documents. That is, a single active component 114A may be re-used by multiple different electronic documents, such as by being embedded in multiple different electronic documents, connecting to different electronic documents, and the like. For example, if active component 114A connects to a payment services provider, two or more different electronic documents may each embed the same active component 114A that may execute to enable each of the different electronic documents to interact with data at the payment services provider.

An author of electronic document 122A, such as a user using sender device 108A to edit electronic document 122A, may insert one or more of active components 114 into electronic document 122A. One or more of active components 114 that are included in electronic document 122A may, while electronic document 122A is open, execute to connect to one or more data sources external to the electronic document to retrieve information from the one or more data sources and/or to otherwise interact with the one or more data sources. The information that one or more of active components 114 may retrieve and/or access from the external data sources may include any suitable data stored at or provided by external data sources that can be accessed via any suitable retrieval technique, such as data that can be retrieved by active components 114 making application programming interface (API) calls to the external data sources. In some examples, active components 114 may retrieve, from the external data sources, values of data fields, such as names, addresses, account numbers, phone numbers, email addresses, and the like. In some examples, active components 114 may retrieve, from the external data sources, data objects, which may be structured data that include a set of data fields. In some examples, active components 114 may retrieve sections of related electronic documents (e.g., master service agreements) that are incorporated by reference in the electronic document. In addition to retrieving information from one or more external data sources, one or more of active components 114 may also execute to perform storage, reuse, computation, modification, and the like of the information from one or more external data sources.

One or more of active components 114 embedded in electronic document 122A may execute to retrieve information from one or more data sources external to electronic document 122A and may present the retrieved information in electronic document 122A in different ways. For example, one or more of active components 114 may retrieve information such as field values (e.g., names, addresses, account numbers, etc.), data objects (e.g., a structured list of information about a customer), sections and/or portions of a related electronic document, or any other information from the one or more external data sources and may embed the retrieved information within the contents of electronic document 122A, such as in one or more fields of electronic document 122A, in the body of electronic document 122A, and the like. In examples where the retrieved information is text, one or more of active components 114 may embed such information as part of the text in the contents of electronic document 122A. In examples where the retrieved information is a table of information, one or more of active components may embed such a table of information around which text may be wrapped in the contents of electronic document 122A.

In some examples, one or more of active components 114 embedded in electronic document 122A may execute to interactively present, in electronic document 122A, information retrieved from one or more external data sources. For example, one or more active components 114 embedded in electronic document 122A may execute to present such information in one or more user interface elements such as modal dialogs, hover dialogs, and the like, that is separate from the content of electronic document 122A. For example, if a portion of the content of electronic document 122A references a section of a related electronic document (e.g., a section of a master services agreement document that is electronic document 122E), an active component may be embedded within the portion of the content in electronic document 122A that references the related document and may, in response to the user hovering a cursor over the portion of the content and/or otherwise selecting or interacting with the portion of the content, present the section of the related electronic document in a modal dialog over the content of electronic document 122A.

In some examples, one or more of active components 114 embedded in electronic document 122A may execute to retrieve information from one or more data sources external to electronic document 122A and to perform one or more actions based on the information retrieved from the one or more data sources. For example, an active component embedded in an input field in electronic document 122A may fetch information from one or more external data sources to perform autocompletion of data inputted into the data field. If the input field is a name field for inputting names of customers, an active component that connects to a customer relationship management platform embedded in the input field may, as the input field receives input, send, to the customer relationship management platform, the characters inputted into the input field and may retrieve, from the customer relationship management platform, suggested customer names for autocompleting the input into the input field.

One or more of active components 114 embedded in electronic document 122A that retrieves information from one or more external data sources for inclusion in the content of electronic document 122A may execute to update the retrieved information included in electronic document 122A based on changes to the information at the one or more external data sources. That is, one or more of active components 114 that retrieves information from one or more external data sources may communicate with the one or more external data sources to determine if the information fetched from the one or more external data sources has changed, such as by periodically querying the one or more external data sources for changes to the value of the information fetched by the one or more of active components 114 and/or by receiving, from the one or more external data sources, updated values of the information. The one or more of active components 114 may, in response to determining that the information fetched from the one or more external data sources has changed, retrieve the latest version and/or the latest values of the information from the one or more external data sources and may update the content of electronic document 122A with the latest values of the information retrieved from the one or more external data sources. In this way, active components 114 may be able update, in real-time, the version and/or value of the information retrieved from one or more external data sources with the latest version and/or values of the information at the one or more external data sources.

In some examples, one or more of active components 114 embedded within electronic document 122A may execute to provide user interface elements for interacting with one or more external data sources. For example, an active component embedded within a date field in electronic document 122A may provide a user interface, such as in the form of a graphical calendar, with which a user may interact to select a date to input into the date field and/or to insert the selected date as an event into an online calendar connected by the active component. In another example, an active component embedded within an address field and that is connected to an online mapping service may provide a user interface, such as in the form of a graphical map provided by the online mapping service, with which a user may interact to select an address or other geographical location to input into the address field.

In some examples, active components 114 embedded within electronic document 122A may execute to perform in-document functions. For example, active components 114 may include code, such as one or more scripts, that document management platform 102 may execute to constrain the values inputted into fields of electronic document 122A based on information contained in other portions of electronic document 122A, such as by constraining the value of a date field in electronic document 122A to be less than or equal to an expiration date specified in electronic document 122A. That is, active components 114 may have domain-level, structured understanding of agreement text within electronic document 122A that affects the operation of active components 114, e.g., with respect to dynamic data retrieved from external data sources. While the core content of the agreement text may be static, active components 114 facilitate dynamically updating variable portions of the agreement text when creating, modifying, and/or negotiating the agreement to provide up-to-date information to the various counterparties.

In some examples, one or more of active components 114 embedded within electronic document 122A may execute to enable a user to interact with information retrieved from external data sources presented in electronic document 122A in order to update or otherwise modify the information in the external data sources. For example, if electronic document 122A is an invoice document, electronic document 122A may include an active component connected to a financial services provider. The active component may execute to retrieve, from the financial services provider, an amount of money that is to be paid by a particular customer and may embed, in the contents of electronic document 122A, the amount of money that is to be paid. A user, such as an author of electronic document 122A, may edit electronic document 122A to change the amount of money that is to be paid, such as by directly editing the amount of money that is to be paid embedded within the content of electronic document 122A. Because the amount of money that is to be paid is embedded by the active component connected to the financial services provider, the active component 114 may execute to, in response to the user editing the amount of money that is to be paid, communicate with the financial services provider to update, at the financial services provider, the amount of money that is to be paid by the particular customer.

In some examples, one or more of active components 114 embedded within electronic document 122A and connected to one or more external data sources may execute to update data objects in the one or more external data sources. In the example where electronic document 122A is an invoice document containing a quote for a service or a product, electronic document 122A may use an active component 114 connected to a payment processing system to receive data from a quote object in the payment processing system that contains information regarding the quote for the service or the product, and document management platform 102 may embed the data from the quote object in the content of electronic document 122A. In examples where the quote object in the payment processing system tracks the state of the invoice document, document management platform 102 may execute the active component connected to the payment processing system to update the quote object with the state of electronic document 122A. For example, document management platform 102 may execute the active component connected to the payment processing system to send, to the payment processing system, an indication that electronic document 122A has transitioned to a sent state when the electronic document has been sent to a recipient to be electronically signed or to send, to the payment processing system, an indication that electronic document 122A has transitioned to a signed state when the recipient has electronically signed the electronic document. In this way, an active component may be able to update a data object at an external data source based on the state of the electronic document, and may update the data object at the external data source to correspond to the state of the electronic document.

As described above, an electronic document such as electronic document 122A may be in an authoring state when electronic document 122A is being authored, a sent state when electronic document 122A has been sent to a signer to be electronically signed, and a signed state when the signer has electronically signed electronic document 122A. Active components 114 may behave differently based on the state of the electronic document. In some examples, an active component 114 that connects to an external data source to retrieve updated data values of a data field in the external data source for inclusion within the content of electronic document 122A may refrain from retrieving updated data values of the data field in the external data source for inclusion within the content of electronic document 122A once the electronic document 122A transitions from the authoring state to the sent state, to prevent certain terms of electronic document 122A from changing after electronic document 122A has been sent for electronic signing.

When electronic document 122A is in a sent state or in a signed state, one or more of active components 114 embedded in electronic document 122A may continue to execute to perform one or more functions. For example, an active component that executes to perform an in-document function, such as to constrain the ranges of values of certain data fields in electronic document 122A may continue to execute, such as in order to prevent a signer from changing dates of the electronic document 122A beyond a valid date range. In another example, an active component that executes to present sections of related documents referenced by electronic document 122A may continue to execute to present sections of related documents referenced by electronic document 122A.

Figure 2:
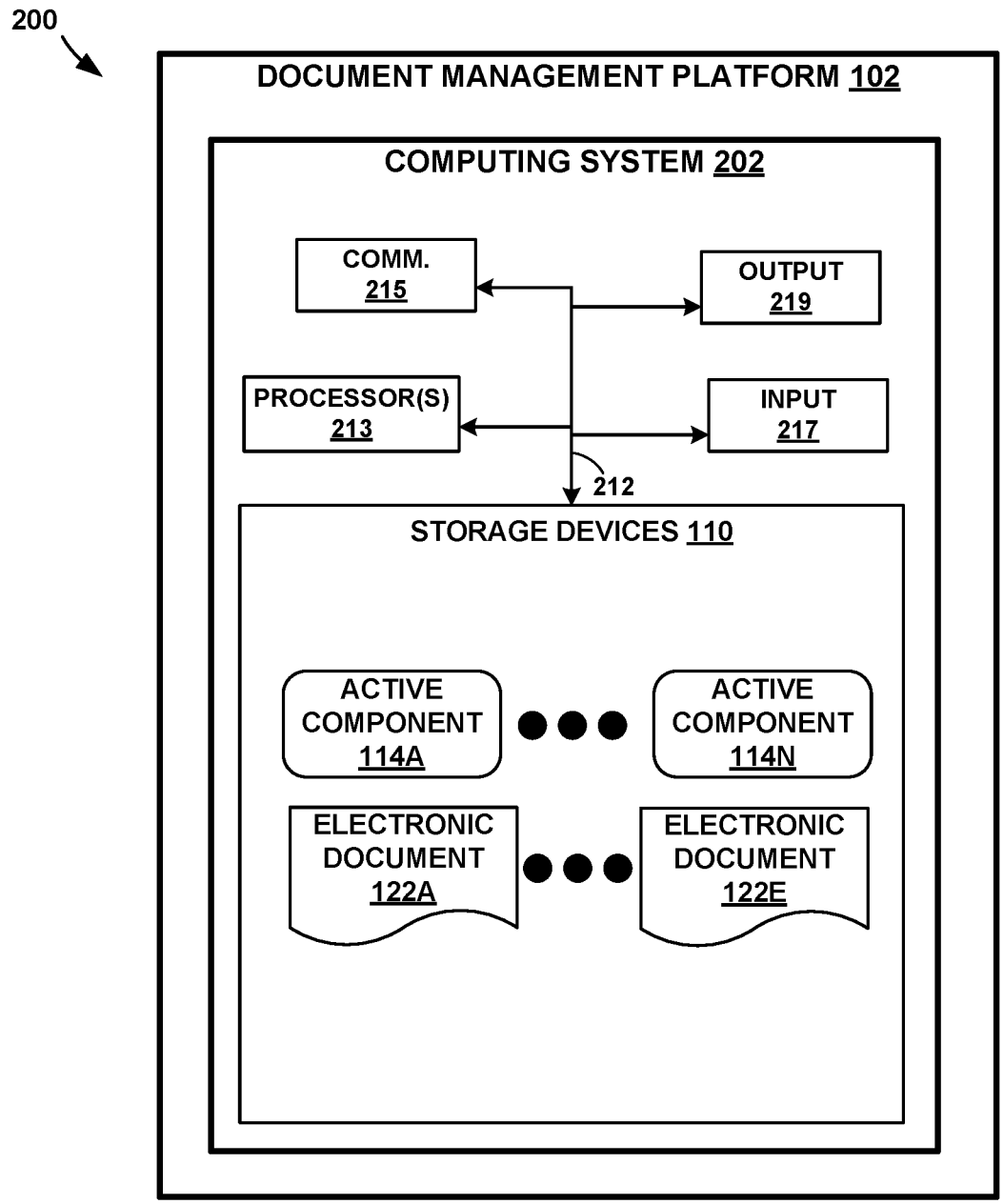
FIG. 2 is a block diagram illustrating an example system, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1. One or more aspects of FIG. 2 may be described herein within the context of FIG. 1.

In the example of FIG. 2, system 200 includes document management platform 102 implemented by computing system 202. In FIG. 2, document management platform 102 may correspond to the document management platform 102 of FIG. 1.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. Computing system 202 may represent or be implemented through one or more virtualized computer instances (e.g., virtual machines, containers) of a cloud computing system, server farm, data center, and/or server cluster.

In the example of FIG. 2, computing system 202 may include one or more communication units 215, one or more input devices 217, one or more output devices 219, and one or more storage devices 110. One or more storage devices may include active components 114 and electronic documents 122, each of which may include software instructions. One or more of the devices, modules, storage areas, or other components of computing system 202 may be interconnected to enable inter-component communications (e.g., physically, communicatively, and/or operatively). In some examples, such connectivity may be provided by communication channels (e.g., communication channels 212), which may represent one or more of a system bus, a network connection, an inter-process communication data structure, or any other method for communicating data.

One or more storage device 110 may represent one or more physical or virtual computers and/or storage devices that include or otherwise have access to storage media. Such storage media may include one or more of Flash drives or thumb drives, solid state drives (SSDs), hard disk drives (HDDs), forms of electrically programmable memories (EPROM) or electrically erasable and programmable (EEPROM) memories, and/or other types of storage media used to support the document management platform 102.

One or more processors 213 of computing system 202 may implement functionality and/or execute instructions associated with computing system 202 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202, such as devices 108 and 109 and computing systems 120, by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include, but are not limited to, a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 219 may represent any output devices of computing system 202 not otherwise separately described herein. Output devices 219 may generate, present, and/or process output. For example, one or more output devices 219 may generate, present, and/or process output in any form. Output devices 219 may include one or more universal serial bus (USB) interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more processors 213 may provide an operating environment or platform for various modules described herein, which may be implemented as software, but may in some examples include any combination of hardware, firmware, and software. One or more processors 213 may execute instructions of one or more modules. Processors 213 may retrieve, store, and/or execute the instructions and/or data of one or more applications, modules, or software. Processors 213 may also be operably coupled to one or more other software and/or hardware components, including, but not limited to, one or more of the components of computing system 202 and/or one or more devices or systems illustrated as being connected to computing system 202.

In accordance with the techniques of this disclosure, one or more processors 213 of computing system 202 may execute document management platform 102 to embed one or more of active components 114 in an electronic document, such as electronic document 122A. Active components 114 may be software components that document management platform 102 may embed in an electronic document to add extensible functionality to the electronic document to transform the electronic document from a static document into a dynamic document that may perform actions within the electronic document and may adaptively interact with external data sources.

Document management platform 102 may enable developers to develop active components 114 using a framework that standardizes how active components 114 connect with data sources, including both data sources at document management platform 102 as well as data sources external to document management platform 102. Document management platform 102 may store mappings of active components to data sources, such as in the form of reference paths to data sources.

Active components 114 may connect actions to the contents of the electronic document and/or to connect the electronic documents with external to data sources external to the electronic document to pass data between the electronic document and the external data sources. Each active component of active components 114 may include code, such as a script, that, when executed, implements logic to perform one or more actions. The one or more actions may include one or more actions within the electronic document and/or one or more actions to interact with an external data source. In some examples, one or more of active components 114 may also include code to present a graphical user interface element, such as in the form of dialogs, fields, and the like. Each active component may be a reusable object, such that different electronic documents at document management platform 102 may embed and use the same active component.

Active components 114 may be embedded in an electronic document as active fields and/or active sections. Active fields may include fields within an electronic document that are able to retrieve data from external data sources and to update external data sources with data. Active sections, which may include one or more active fields, may also embed external data objects, such as data objects retrieved from external data sources, within the content of the electronic document.

One or more of active components 114 embedded in an electronic document may execute (e.g., at one or more processors 213) to connect to one or more data sources external to the electronic document. Such data sources external to the electronic document may include one or more computing systems 120 that are external to document management platform 102. Examples of such data sources external to an electronic document may include a customer relationship management platform, a financial services platform, a web mapping service, an email service, a calendaring service, and the like. Data sources that are external to an electronic document may also include one or more other electronic documents at document management platform 102.

The information that active components 114 may retrieve and/or access from external data sources may include any suitable data stored at or provided by external data sources that can be accessed via any suitable retrieval technique, such as data that can be retrieved by active components 114 making application programming interface (API) calls to the external data sources. In some examples, active components 114 may retrieve, from the external data sources, values of data fields, such as names, addresses, account numbers, phone numbers, email addresses, and the like. In some examples, active components 114 may retrieve, from the external data sources, data objects, which may be structured data that include a set of data fields. In some examples, active components 114 may retrieve sections of related electronic documents (e.g., master service agreements) that are incorporated by reference in the electronic document.

Active components 114 that connect to data sources external to document management platform 102 may utilize or implement a connector, which may be a software component, to connect to such external data sources. A connector to an external data source may contain authentication details associated with the external data source, such as passwords, tokens, secrets, and the like, and/or may provide means for an active component to provide credentials to the external data source in order to authenticate the active component with the data source.

Active components 114 that connect to data sources may ingest data from such data sources and may transform the ingested data to convert such data into consistent formats. Action components 114 may include actions that support input and output models. That is, an active component that connects to a data source may be associated with an input model that specify, based on requirements of the data source connected to the active component, data that is to be extracted from an electronic document in which the active component is embedded. The active component may also be associated with an output model that specify the data retrieved from the connected data source that is to be returned to an electronic document in which the active component is embedded and the values retrieved from the connected data source and embedded in the electronic document that are to be updated in the electronic document.

In some examples, an action component may retrieve data from an electronic document in which the active component is embedded by accepting, from the electronic document, POST requests with JSON payloads conforming to the input model that contains data extracted from an electronic document. Similarly, an action component may transmit data from the data source connected to the active component to the electronic document by returning responses containing JSON payloads conforming to the output model that contains the data retrieved from the data source. An active component may transform data retrieved from a data source, such as by performing one or more JSON transformations, prior to transmitting the data to an electronic document, so that the transformed data is consistent with the structure of the electronic document, such as by conforming to field names in the electronic document, thereby enabling the electronic document to embed data retrieved from the data source into fields in the electronic document. For example, an active component may use a data model associated with the electronic document, which may be in the form of metadata, that specifies the structure of the electronic document, to transform data retrieved from data sources into a form that can be embedded and/or presented in the electronic document.

One or more of active components 114 embedded in an electronic document may execute to retrieve information from one or more data sources external to the electronic document and may present the retrieved information in the electronic document in different ways. In some examples, an active component that is an autocomplete type may execute to retrieve one or more data values (e.g., names, addresses, account numbers, etc.) from an external data source and may execute to return the data values into one or more fields in the content of the electronic document. For example, an active component may connect to a payment processing system to retrieve a list of one or more products offered by a company and may return the retrieved list of one or more products into one or more fields in the electronic document, thereby embedding the list of one or more products offered by the company into the electronic document.

In another example, an active component may be of an autocomplete type that executes to connect to an external data source to provide type ahead functionality for one or more fields in the electronic document. For example, as a user inputs an address into an address field in the electronic document, the active component may execute to connect to a customer relationship management system to look up customer addresses that may partially match the text inputted into the address field and may execute to present suggested addresses that the user may select to input one of the suggested addresses into the address field.

An active component that retrieves information from a data source may, in some examples, execute to update the retrieved information based on changes to the information at one or more external data sources. That is, an active component that retrieves information from an external data source may communicate with the one or more external data sources to determine if the information fetched from the one or more external data sources has changed, such as by periodically querying the one or more external data sources for changes to the value of the information feted by the active component and/or by receiving, from the one or more external data sources, updated values of the information. The active component may, in response to determining that the information fetched from the external data source has changed, retrieve the latest version and/or the latest values of the information from the external data source and may return the latest version and/or the latest values of the information to one or more fields of the electronic document. In this way, an active component may be able update, in real-time, the version and/or value of the information retrieved from an external data source with the latest version and/or values of the information at the external data source.

In some examples, an active component that retrieves a data value from an external data source and returns the data value into a field in the content of the electronic document may also enable a user (e.g., an author) of the electronic document to update the data value in the external data source. That is, a user may modify a data value in a field of the electronic document that was retrieved by the active component from the external data source and returned into the field, and the active component may send the modified data value to update the external data source with the modified data value.

For example, if an electronic document is an invoice, the electronic document may include an active component connected to a financial services provider. The active component may execute to retrieve, from the financial services provider, an amount of money that is to be paid by a particular customer and may embed, in the contents of the document, the amount of money that is to be paid. A user, such as an author of the electronic document, may edit the electronic document to change the amount of money that is to be paid, such as by directly editing the amount of money that is to be paid embedded within the content of the electronic document. Because the amount of money that is to be paid is embedded by the active component connected to the financial services provider, the active component 114 may execute to, in response to the user editing the amount of money that is to be paid, communicate with the financial services provider to update, in the financial services provider, the amount of money that is to be paid by the particular customer.

In some examples, an active component may be of a rich object type that executes to retrieve data objects (e.g., structured data) from an external data source, and the active component may execute to present a graphical user interface element to present the retrieved data object. For example, an active component embedded or associated with an address field in the electronic document may connect to a mapping service to retrieve a map object. The active component may present a graphical user interface element to present the map object in the form of an interactive graphical map to enable a user to select a location on the graphical map to input an address into the address field that corresponds to the selected location on the graphical map.

In another example, an active component embedded or associated with a date field in the electronic document may connect to a calendaring service to retrieve a calendar object. The active component may present a graphical user interface element to present the calendar object in the form of an interactive calendar to enable a user to select a date in the calendar to input a date into the date field. The active component may also enable the user to use the interactive calendar to create calendar events or tasks associated with the selected date.

In another example, an electronic document may include a party field that specifies one or more parties (e.g., people) in a contract. An active component embedded or associated with the party field in the electronic document may connect to a messaging service (e.g., an email service, an instant messaging service, etc.) to retrieve a messaging object. The active component may present a graphical user interface element to present the messaging object in the form of an interactive messaging user interface to enable a user to send and receive messages to and from one or more of the parties listed in the party field.

In some examples, an active component embedded in an electronic document may execute to interactively present, in the electronic document, information retrieved from one or more external data sources. For example, an active component embedded in an electronic document may execute to present such information in one or more user interface elements such as modal dialogs, hover dialogs, and the like, that is separate from the content of the electronic document. For example, if a portion of the content of the electronic document references a section of a related electronic document (e.g., a section of a master services agreement document), an active component embedded within the portion of the content that references the related document may execute to, in response to the user hovering a cursor over the portion of the content and/or otherwise selecting the portion of the content, present the section of the related electronic document in a modal dialog over the content of the electronic document.

In some examples, an active component embedded within an electronic document may be of an external function type that executes to perform actions on an external data source connected to the active component. For example, an active component embedded within a bank transfer field in the electronic document may communicate with a payment processing system to cause the payment processing system to perform a bank transfer verification function to verify the bank transfer details inputted into the bank transfer field. In another example, an active component embedded within an electronic document may execute to communicate with an external data source to create new data objects in the external data source. For example, an active component embedded within a field of the electronic document that specifies recurring payments (e.g., a subscription) that is to be paid may communicate with a payment processing platform to create a corresponding subscription object at the payment processing platform that includes the details of the subscription, such as the product (e.g., a good or a service) that is being sold, the price, the customer, the payment method, and the like.

In some examples, an active component embedded within an electronic document may be of an embedded function type that executes to perform in-document functions. For example, an active component may include code, such as one or more scripts, that document management platform 102 may execute to limit the values inputted into fields of the electronic document based on information contained in other portions of the electronic document, such as by limit the value of a date field in the electronic document to be less than or equal to an expiration date specified in the electronic document.

An electronic document may have a state that may change throughout the lifecycle of the electronic document, and active components embedded within an electronic document may perform differently based on the state of the electronic document. In the example where the electronic document is an agreement document (e.g., an invoice, a contract, etc.), the electronic document may be in an authoring state when the electronic document is being authored, in a sent state when the electronic document has been sent to a recipient to be electronically signed, and in a signed state when the recipient has electronically signed the electronic document.

Active components 114 may behave differently based on the state of the electronic document. In some examples, an active component that connects to an external data source to retrieve updated data values of a data field in the external data source for inclusion within the content of electronic document 122A may refrain from retrieving updated data values of the data field in the external data source for inclusion within the content of electronic document 122A once the electronic document 122A transitions from the authoring state to the sent state, to prevent certain terms of electronic document 122A from changing after electronic document 122A has been sent for electronic signing.

When electronic document 122A is in a sent state or in a signed state, one or more of active components 114 embedded in electronic document 122A may continue to execute to perform one or more functions. For example, an active component that executes to perform an in-document function, such as to constrain the ranges of values of certain data fields in electronic document 122A may continue to execute, such as in order to prevent a signer from changing dates of the electronic document 122A beyond a valid date range. In another example, an active component that executes to present sections of related documents referenced by electronic document 122A may continue to execute to present sections of related documents referenced by electronic document 122A.

FIGS. 3A-3G are conceptual diagrams illustrating example graphical user interfaces for embedding active components in an electronic document, in accordance with one or more techniques of this disclosure. The example of FIGS. 3A-3G is described below within the context of FIGS. 1 and 2 for example purposes only. As shown in FIGS. 3A-3G, document management platform 102 of computing system 202 may output, for display at devices 108 and/or devices 190, GUIs 330A-330G which are GUIs that present the contents of an electronic document when the document is open for editing and/or for viewing.

Figure 3A:
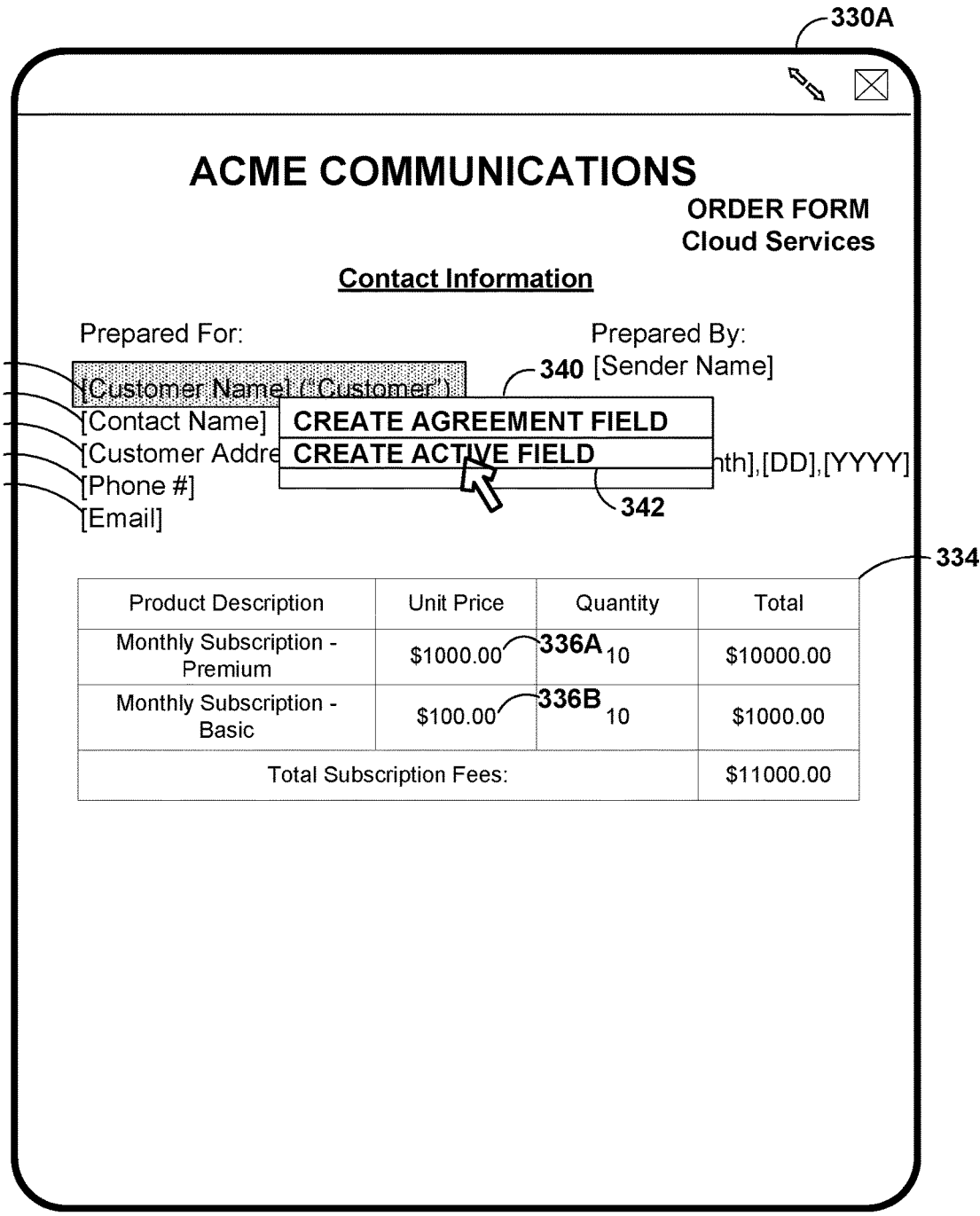

In the example of FIG. 3A, GUI 330A illustrates an example GUI that presents content of an electronic document that is being authored. Such an electronic document, in the example of FIG. 3A, is an invoice document that is being authored. The electronic document includes fields 332A-

332E, and the author may edit the electronic document to fill out fields 332A. For example, the author may edit field 332A to insert a customer name, edit field 332B to insert a contact name, edit field 332C to insert a customer address, edit field 332D to insert a phone number, and edit field 332E to insert an email address.

A user that is authoring the electronic document may embed an active component in the electronic document. For example, a user may set field 332A to be an active field, which may be an active component that connects field 332A to a field in an external data source. GUI 330A may present menu 340 that includes menu option 342 for setting the selected field 332A to be an active field, and the user may interact with menu 340 presented in GUI 330A to select menu option 342 to set field 332A to be an active field, thereby embedding an active component in the electronic document.

In the example of FIG. 3A, the electronic document may also include table 334, which lists products that are being purchased, the price of the products, the quantity of the products being purchased, and the total amount of money being invoiced for the purchase of the listed products. In some examples, fields of table 334 may be active fields, which are active components connected to an external data source. For example, fields 336A and 336B may be active fields connected to a payment processing system that retrieves prices for the products being purchased, as listed in table 334, from the payment processing system.

Figure 3B:
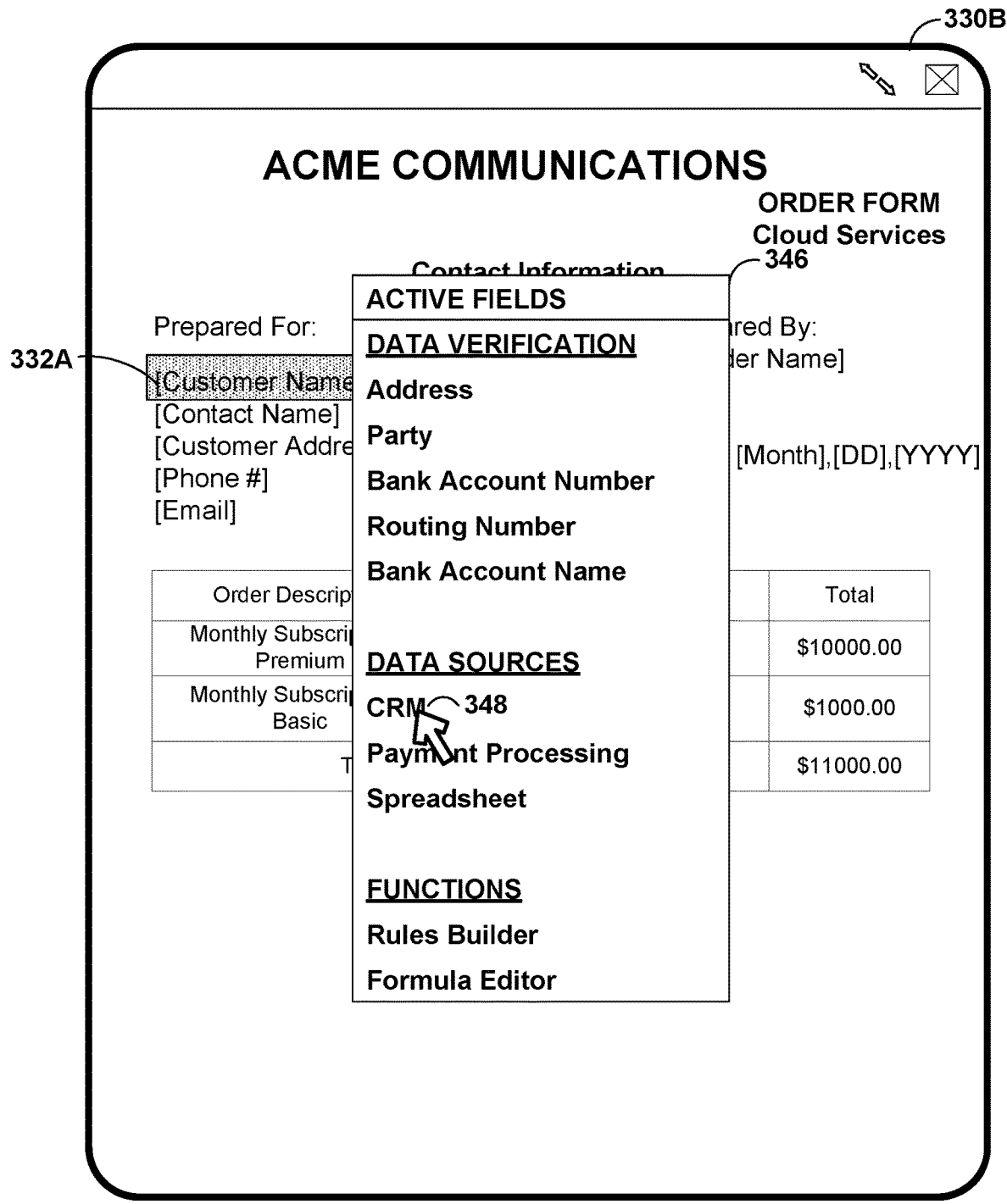

In the example of FIG. 3B, GUI 330B illustrates that after the user selects the option to set field 332A to be an active field, GUI 330B may present menu 346 that may list the actions that can be performed by the active field. For example, the active field may perform data verification functions, connect to external data sources, and/or perform one or more other functions. The user may select, from menu 346, the action that is to be performed by the active field. In the example of FIG. 3B, because a customer relationship management system may include the names of customers, the user may select menu option 348 to connect the active field to the customer relationship management system.

Figure 3C:
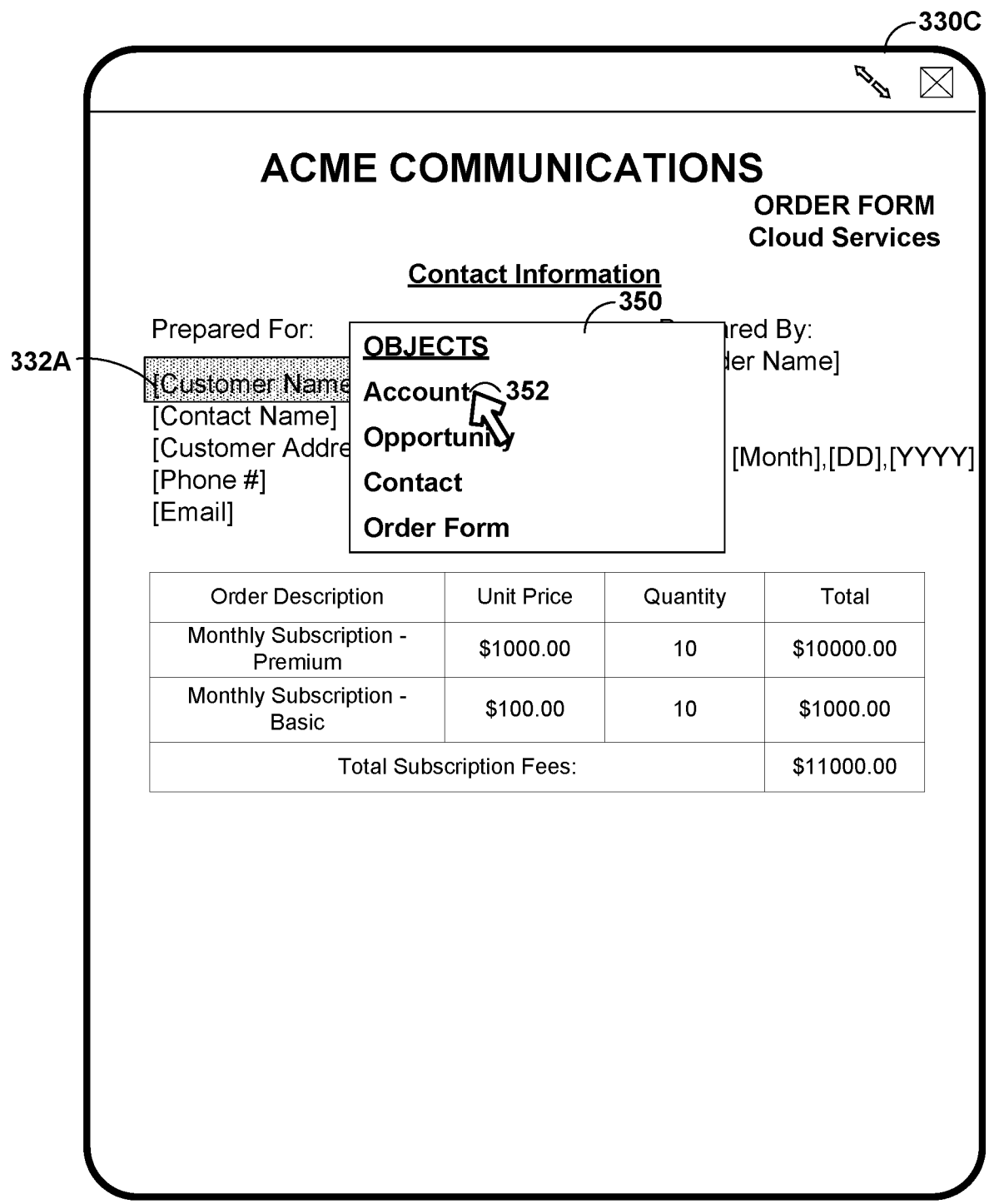

In the example of FIG. 3C, GUI 330C illustrates that after the user selects to connect the active field to the customer relationship management system, GUI 330C may present menu 350 that may list the data objects in the customer relationship management system to which the active field may connect. The user may select, from menu 350, the data object to which the active field is connected. In the example of FIG. 3C, the user may select menu option 352 to connect the active field to an account object.

In the example of FIG. 3D, GUI 330D illustrates that after the user selects to connect the active field to the accounts object, GUI 330D may present menu 354 that may list the fields in the accounts object that the active field may access. The user may select, from menu 354, the field in the accounts object that the active field may access. In the example of FIG. 3D, the user may select menu option 356 to set the active field as accessing an account name field of the account object.

Figure 3E:
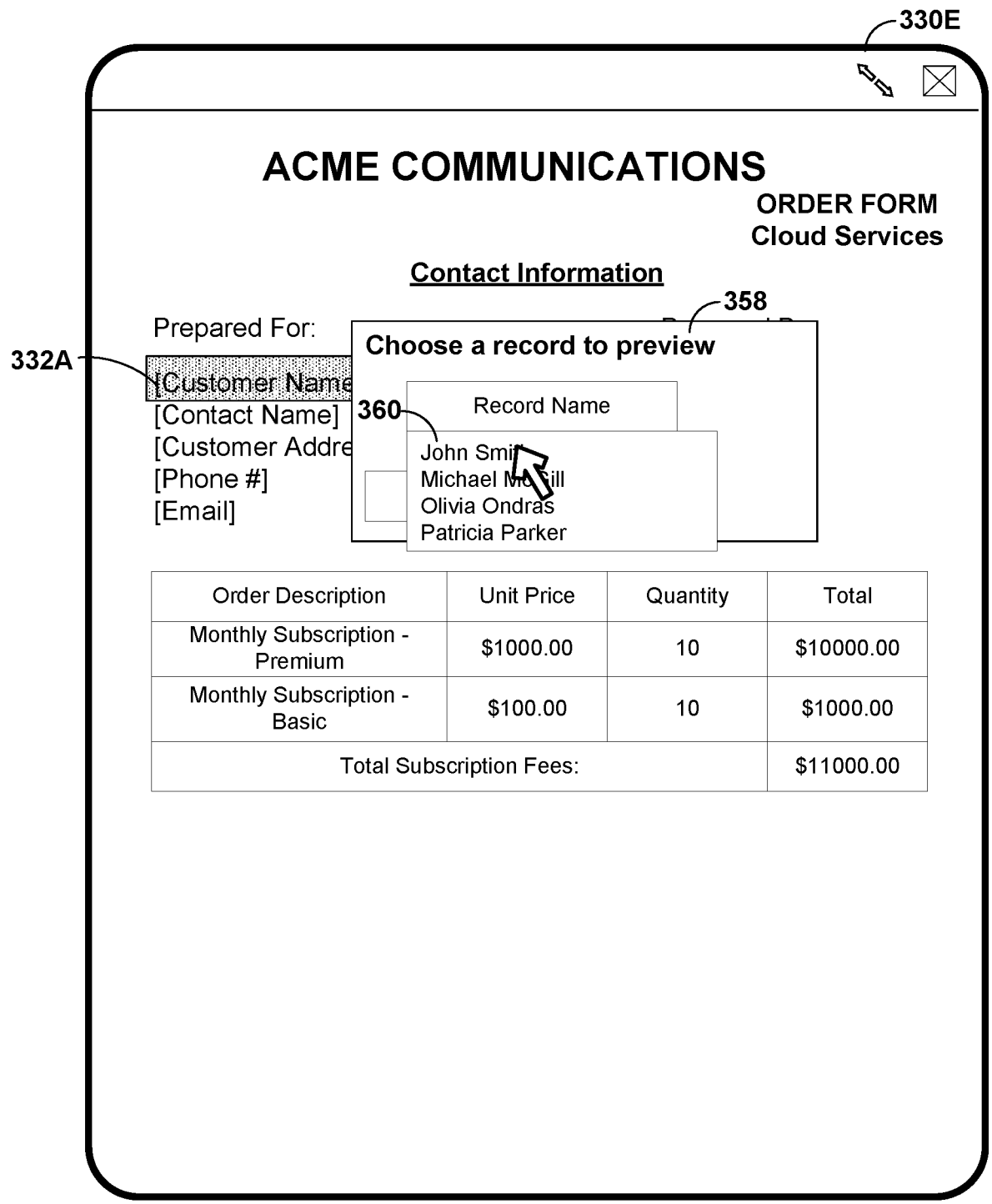

In the example of FIG. 3E, GUI 330E illustrates that after the user sets the active field as accessing the account name field of the account object in the customer relationship management system, GUI 330E may present menu 358 that may list the records in the account name field of the account object, which may be a list of customer names. The user may select, from menu 358, a name from the list of customer names to be inserted into the active field. In the example of FIG. 3E, the user may select name 360 to insert the name "John Smith" into the active field.

In the example of FIG. 3F, GUI 330F illustrates the result of the active field inserting the name "John Smith" retrieved from the customer relationship management system into field 332A of the electronic document. As can be seen, instead of manually typing or manually copying and pasting a name into field 332A, an active component such as an active field can be created and embedded into the electronic document to retrieve data, such as a name, from an external data source, and the data retrieved from the external data source can be inputted into field 332A.

Figure 3G:
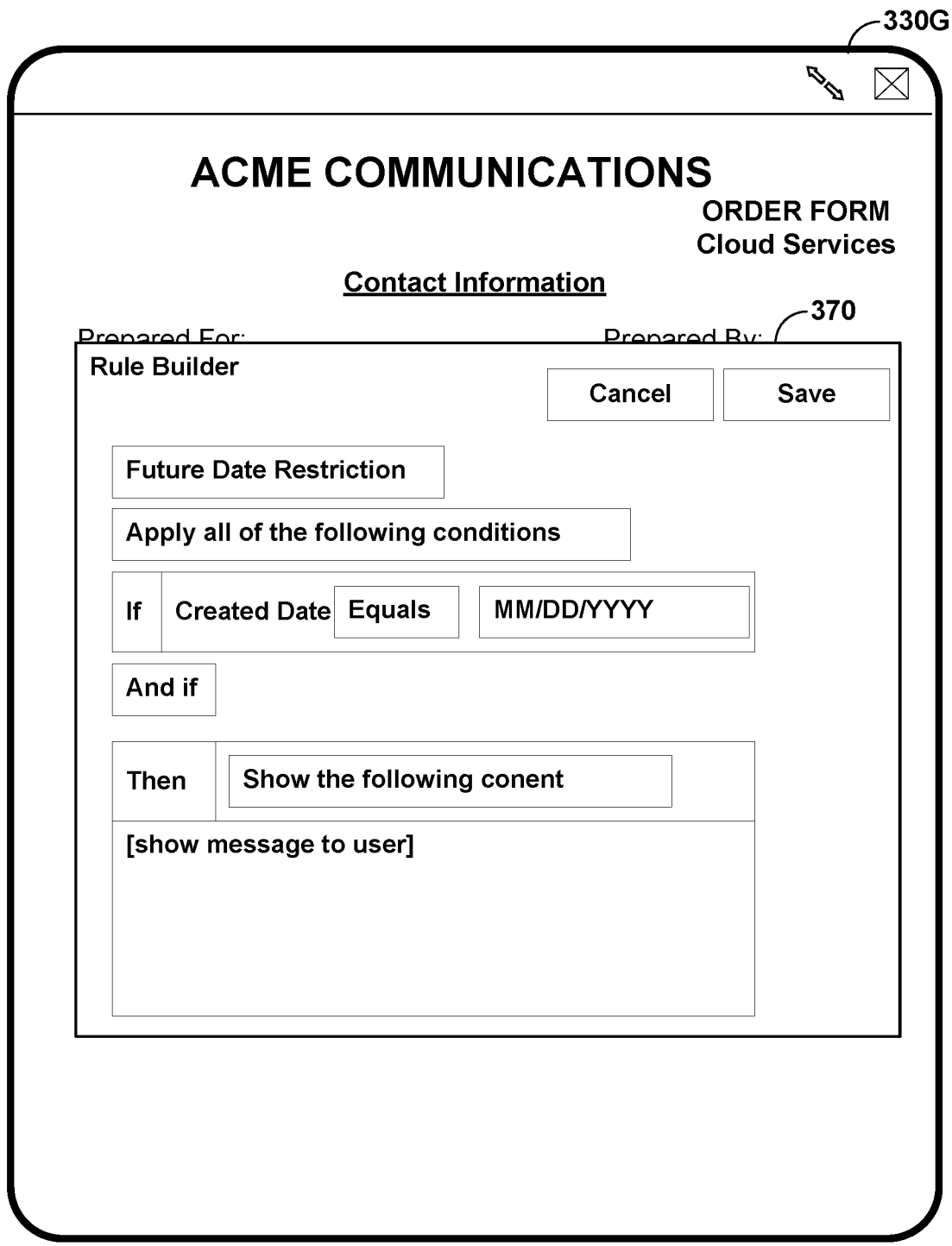

In the example of FIG. 3G, GUI 330G illustrates that a user may configure an active component to perform a function to enforce a rule associated with the active component. As shown in FIG. 3G, GUI 330G may present rules builder interface 370 that enables a user to configure a rule associated with a data field, such as a date field, that is enforced by an active component embedded in the data field. The rule being configured in rules builder interface 370 may restrict the dates that can be inputted into a date field, and may enable the active component to output a message if the active component detects that data related to the date inputted into the date field does not meet the rules enforced by the active component.

Figure 4:
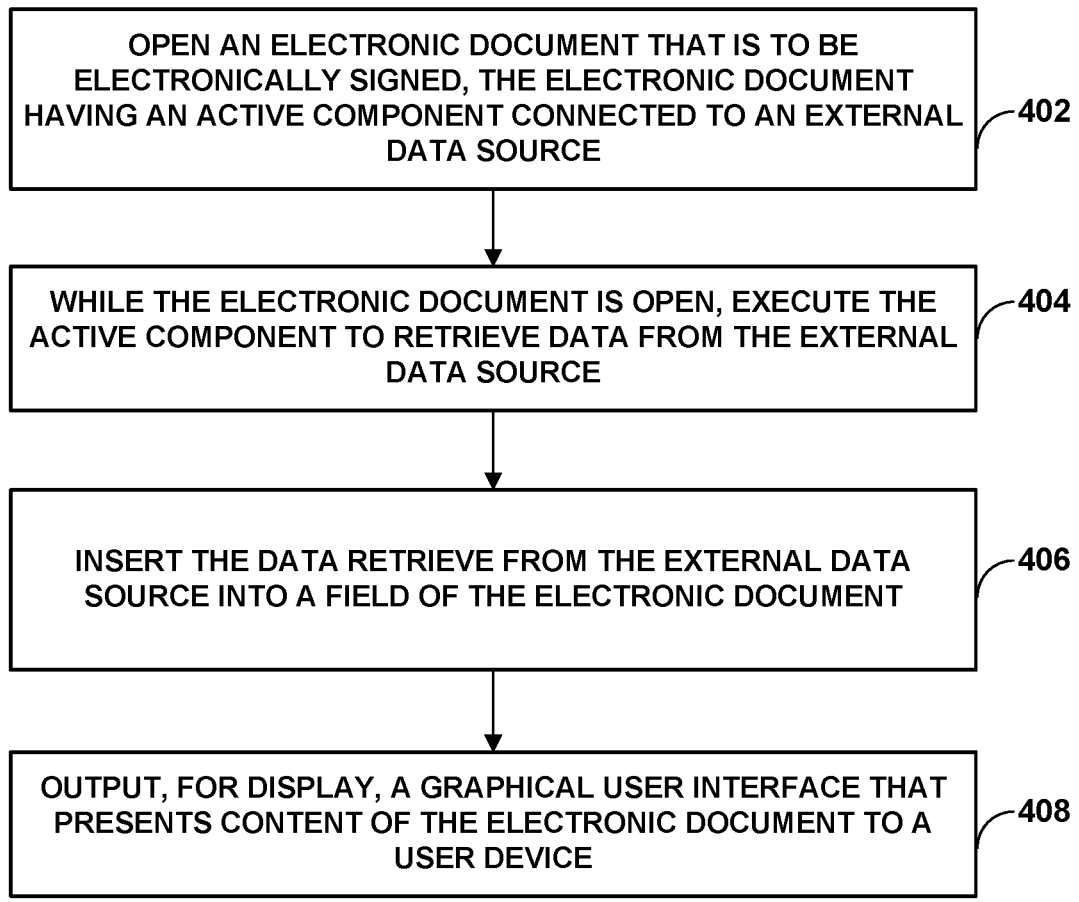
FIG. 4 is a flow chart illustrating an example process for active components to perform one or more functions in an electronic document, in accordance with one or more aspects of the present disclosure.

FIG. 4 is a flow chart illustrating an example process for active components to perform one or more functions in an electronic document, in accordance with one or more aspects of the present disclosure. One or more aspects of FIG. 4 are described herein within the context of FIGS. 1, 2, and 3A-3G for example purposes only.

As shown in FIG. 4, one or more processors 213 of document management platform 102 may open an electronic document 122A that is to be electronically signed, the electronic document 122A having an active component 114A connected to an external data source (402). While the electronic document 122A is open, one or more processors 213 may execute the active component 114A to retrieve data from the external data source (404). One or more processors 213 may insert the data retrieved from the external data source into content of the electronic document 122A (406). One or more processors 213 may output, for display, content of the electronic document 122A to a user device (408).

In some examples, the data from the external data source is a data value of a data field in the external data source, and one or more processors 213 may, while the electronic document 122A is open, execute the active component 114A to determine that the data value of the data field has been updated and to, in response, retrieve an updated data value of the data field from the external data source. One or more processors 213 may therefore insert the updated data value into the field of the electronic document 122A. In some examples, one or more processors 213 may determine that the electronic document 122A has been sent to a signing party for electronic signing and may, in response to determining that the electronic document 122A has been sent to the signing party for electronic signing, refrain from executing the active component 114A to determine whether the data value of the data field has been updated and refrain from changing a value of the field of the electronic document 122A.

In some examples, the data from the external data source is a data value of a data field in the external data source, and one or more processors 213 may receive data input into the field of the electronic document 122A and may, in response to receiving the data input into the data field, execute the active component 114A to update the data value of the data field in the external data source based on the data input.

In some examples, to execute the active component to retrieve the data from the external data source, one or more processors 213 may receive data input into the field of the electronic document 122A and may execute the active component 114A to select, based on the input into the field, the data that is retrieved from the external data source to perform autocompletion of the received data input into the field.

In some examples, electronic document 122A includes a second active component 114N connected to a second electronic document 122E. One or more processors 213 may receive an indication of user interaction with a portion of the electronic document 122A that references a section of the second electronic document 122E and may, in response to receiving the indication of user interaction with the portion of the electronic document 122A, execute the second active component 114N to present, in the graphical user interface over the content of the electronic document 122A, the section of the second electronic document 122E referenced in the electronic document 122A.

In some examples, data from the external data source is associated with a data object at the external data source, and one or more processors 213 may determine that a state of the electronic document 122A has changed. One or more processors 213 may, in response to determining that the state of the electronic document 122A has changed, execute the active component 114A to communicate with the external data source to update the data object at the external data source based on the state of the electronic document 122A.

In some examples, to determine that the state of the electronic document 122A has changed, one or more processors 213 may determine that the electronic document 122A has been sent to a signing party for electronic signing and may, in response to determining that the electronic document 122A has been sent to the signing party for electronic signing, determine that the state of the electronic document 122A is a sent state.

In some examples, to determine that the state of the electronic document 122A has changed, one or more processors 213 may determine that the electronic document 122A has been electronically signed by a signing party and may, in response to determining that the electronic document 122A has been electronically signed by the signing party, determine that the state of the electronic document 122A is a signed state.

In some examples, to insert the data retrieved from the external data source into a field of the electronic document 122A, one or more processors 213 may execute the active component 114A to transform the data retrieved from the external data source based on metadata that specifies a data model associated with the electronic document 122A to generate transformed data. One or more processors 213 may therefore execute the active component 114A to transmit the transformed data in a structured data payload to the electronic document 122A to insert the transformed data into the field of the electronic document 122A.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising one or more processors having access to a memory, the one or more processors configured to:
    open an electronic document that is to be electronically signed, the electronic document having an active component configured to communicate with an external data source;
    while the electronic document is open, execute the active component to retrieve data from the external data source, wherein the data from the external data source is a data value of a data field in the external data source;
    insert the data from the external data source into a field of the electronic document;
    determine that the electronic document has been sent to a signing party for electronic signing;
    in response to determining that the electronic document has been sent to the signing party for electronic signing, refrain from executing the active component to determine whether the data value of the data field has been updated and refrain from changing a value of the field of the electronic document; and
    output, for display at a user device, a graphical user interface that presents content of the electronic document, the content of the electronic document including the data inserted into the field of the electronic document.

2. The computing system of claim 1, wherein the one or more processors are further configured to:
    while the electronic document is open, execute the active component to determine that the data value of the data field has been updated and to, in response, retrieve an updated data value of the data field from the external data source; and
    insert the updated data value into the field of the electronic document.

3. The computing system of claim 1, wherein the one or more processors are further configured to:
    receive data input into the field of the electronic document; and
    in response to receiving the data input into the data field, execute the active component to update the data value of the data field in the external data source based on the data input.

4. The computing system of claim 1, wherein to execute the active component to retrieve the data from the external data source, the one or more processors are further configured to:
    receive data input into the field of the electronic document; and
    execute the active component to select, based on the data input into the field, the data that is retrieved from the external data source to perform autocompletion of the received data input into the field.

5. The computing system of claim 1, wherein the electronic document includes a second active component connected to a second electronic document, wherein the one or more processors are further configured to:
    receive an indication of user interaction with a portion of the electronic document that references a section of the second electronic document; and
    in response to receiving the indication of user interaction with the portion of the electronic document, execute the second active component to present, in the graphical user interface over the content of the electronic document, the section of the second electronic document referenced in the portion of the electronic document.

6. The computing system of claim 1, wherein the data from the external data source is associated with a data object at the external data source, and wherein the one or more processors are further configured to:
    determine that a state of the electronic document has changed; and
    in response to determining that the state of the electronic document has changed, execute the active component to communicate with the external data source to update the data object at the external data source based on the state of the electronic document.

7. The computing system of claim 6, wherein to determine that the state of the electronic document has changed, the one or more processors are further configured to:
    determine that the electronic document has been sent to the signing party for electronic signing; and
    in response to determining that the electronic document has been sent to the signing party for electronic signing, determine that the state of the electronic document is a sent state.

8. The computing system of claim 6, wherein to determine that the state of the electronic document has changed, the one or more processors are further configured to:
    determine that the electronic document has been electronically signed by the signing party; and
    in response to determining that the electronic document has been electronically signed by the signing party, determine that the state of the electronic document is a signed state.

9. The computing system of claim 1, wherein to insert the data from the external data source into a field of the electronic document, the one or more processors are further configured to:

execute the active component to transform the data retrieved from the external data source based on metadata that specifies a data model associated with the electronic document to generate transformed data; and execute the active component to transmit the transformed data in a structured data payload to the electronic document to insert the transformed data into the field of the electronic document.

10. The computing system of claim 1, wherein the one or more processors are further configured to:

execute the active component to constrain a value of a data field in the content of the electronic document based at least in part on information contained in another portion of the content of the electronic document.

11. A method comprising:

opening, by one or more processors, an electronic document that is to be electronically signed, the electronic document having an active component configured to communicate with an external data source;

while the electronic document is open, executing, by the one or more processors, the active component to retrieve data from the external data source, wherein the data from the external data source is a data value of a data field in the external data source;

inserting, by the one or more processors, the data retrieved from the external data source into a field of the electronic document;

determining, by the one or more processors, that the electronic document has been sent to a signing party for electronic signing;

in response to determining that the electronic document has been sent to the signing party for electronic signing, refraining, by the one or more processors, from executing the active component to determine whether the data value of the data field has been updated and refrain from changing a value of the field of the electronic document; and outputting, by the one or more processors and for display at a user device, a graphical user interface that presents content of the electronic document, the content of the electronic document including the data inserted into the field of the electronic document.

12. The method of claim 11, further comprising:

while the electronic document is open, executing, by the one or more processors, the active component to determine that the data value of the data field has been updated and to, in response, retrieve an updated data value of the data field from the external data source; and inserting, by the one or more processors, the updated data value into the field of the electronic document.

13. The method of claim 11, further comprising:

receiving, by the one or more processors, data input into the field of the electronic document; and in response to receiving the data input into the data field, executing, by the one or more processors, the active component to update the data value of the data field in the external data source based on the data input.

14. The method of claim 11, wherein executing the active component to retrieve the data from the external data source, the one or more processors further comprises:

receiving, by the one or more processors, data input into the field of the electronic document; and executing, by the one or more processors, the active component to select, based on the data input into the field, the data that is retrieved from the external data source to perform autocompletion of the received data input into the field.

15. The method of claim 11, wherein the electronic document includes a second active component connected to a second electronic document, further comprising:

receiving, by the one or more processors an indication of user interaction with a portion of the electronic document that references a section of the second electronic document; and in response to receiving the indication of user interaction with the portion of the electronic document, executing, by the one or more processors, the second active component to present, in the graphical user interface over the content of the electronic document, the section of the second electronic document referenced in the electronic document.

16. The method of claim 11, wherein the data from the external data source is associated with a data object at the external data source, further comprising:

determining, by the one or more processors, that a state of the electronic document has changed; and in response to determining that the state of the electronic document has changed, executing, by the one or more processors, the active component to communicate with the external data source to update the data object at the external data source based on the state of the electronic document.

17. The method of claim 16, wherein determining that the state of the electronic document has changed further comprises:

determining, by the one or more processors, that the electronic document has been sent to the signing party for electronic signing; and in response to determining that the electronic document has been sent to the signing party for electronic signing, determining, by the one or more processors, that the state of the electronic document is a sent state.

18. A non-transitory computer-readable storage medium encoded with instructions that, when executed, cause at least one processor of a computing system to:

open an electronic document that is to be electronically signed, the electronic document having an active component configured to communicate with an external data source;

while the electronic document is open, execute the active component to retrieve data from the external data source, wherein the data from the external data source is a data value of a data field in the external data source;

insert the data retrieved from the external data source into a field of the electronic document;

determine that the electronic document has been sent to a signing party for electronic signing;

in response to determining that the electronic document has been sent to the signing party for electronic signing, refrain from executing the active component to determine whether the data value of the data field has been updated and refrain from changing a value of the field of the electronic document; and output, for display, a graphical user interface that presents content of the electronic document, the content of the electronic document including the data inserted into the field of the electronic document.

* * * * *